United States Patent
Jessie et al.

(10) Patent No.: US 9,016,812 B2
(45) Date of Patent: Apr. 28, 2015

(54) TRANSLATABLE SUPPORT MECHANISM

(71) Applicant: General Electric Company, Schenectady, NY (US)

(72) Inventors: Jeffrey Lynn Jessie, Taylorsville, KY (US); Stephen Bernard Froelicher, Shepherdsville, KY (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 13/909,583

(22) Filed: Jun. 4, 2013

(65) Prior Publication Data

US 2014/0354132 A1  Dec. 4, 2014

(51) Int. Cl.
- *A47B 88/14* (2006.01)
- *F25D 25/02* (2006.01)
- *A47B 88/04* (2006.01)
- *F16H 19/04* (2006.01)

(52) U.S. Cl.
CPC .............. *F25D 25/025* (2013.01); *A47B 88/04* (2013.01); *A47B 88/14* (2013.01); *F16H 19/04* (2013.01); *A47B 2210/0078* (2013.01)

(58) Field of Classification Search
USPC .............. 312/402, 404, 321, 331, 332, 334.1, 312/334.7, 334.8, 350
See application file for complete search history.

(56) References Cited

U.S. PATENT DOCUMENTS

| | | | | |
|---|---|---|---|---|
| 3,794,401 A | * | 2/1974 | Dean et al. | 312/323 |
| 4,254,928 A | | 3/1981 | Huempfner et al. | |
| 4,757,725 A | * | 7/1988 | Beugin | 74/422 |
| 5,836,205 A | * | 11/1998 | Meyer | 74/89.17 |
| 6,283,422 B1 | * | 9/2001 | Stoelinga | 248/188.2 |
| 6,641,239 B2 | * | 11/2003 | Kaiser | 312/404 |
| 6,851,775 B2 | * | 2/2005 | Kaiser | 312/404 |
| 7,536,927 B2 | * | 5/2009 | Fleytman | 74/89.17 |
| 7,677,125 B2 | * | 3/2010 | Rotter | 74/422 |
| 8,147,013 B2 | * | 4/2012 | Park | 312/402 |
| 8,376,481 B2 | * | 2/2013 | Lee | 312/402 |
| 8,522,636 B2 | * | 9/2013 | Uchida | 74/422 |
| 8,562,087 B2 | * | 10/2013 | Eom et al. | 312/402 |
| 8,668,287 B2 | * | 3/2014 | Schwarzmann | 312/332 |
| 8,668,290 B2 | * | 3/2014 | Rotter et al. | 312/402 |

FOREIGN PATENT DOCUMENTS

| | | |
|---|---|---|
| CH | 569889 A5 | 11/1975 |
| CN | 101210763 A | 7/2008 |
| DE | 2618558 A1 | 11/1977 |
| DE | 10009390 A1 | 9/2001 |
| EP | 1018312 A2 | 7/2000 |
| JP | 5923151 A | 2/1984 |
| JP | 01151409 A | 6/1989 |
| JP | 2012013204 A | 1/2012 |

OTHER PUBLICATIONS

International Search Report and Written Opinion issued in connection with corresponding PCT Application No. PCT/US2014/036765 on Aug. 4, 2014.

* cited by examiner

*Primary Examiner* — Daniel Rohrhoff
(74) *Attorney, Agent, or Firm* — Dority & Manning, P.A.

(57) ABSTRACT

A translatable support mechanism is provided. The translatable support mechanism includes a storage component, a pair of supports, and a pair of gear sets. The pair of supports and the pair of gear sets support the storage component such that the storage component is translatable between an open and closed position along a transverse direction.

16 Claims, 8 Drawing Sheets

TRANSLATABLE SUPPORT MECHANISM

FIELD OF THE INVENTION

The present subject matter relates generally to translatable support mechanisms, such as drawer assemblies for refrigerator appliances.

BACKGROUND OF THE INVENTION

Certain refrigerator appliances include drawers positioned within chilled chambers of the refrigerator appliances. The drawers are generally slidably mounted within the refrigerator appliance such that the drawer can be selectively adjusted between a closed position and an open position. Food items and other articles can be placed within the drawers when the drawers are in the open position, and the drawers can be shifted to the closed position in order to conveniently store such food items and/or improve a storage life of such food items. Other appliances, such as oven appliances, washing machine appliances, and dishwasher appliances, can also include similar drawers for storing articles therein.

Various mechanisms have been provided to slidably mount drawers within appliances. Such mechanisms suffer from various problems and drawbacks. For example, roll-formed drawer slides with ball bearings positioned between adjacent drawer slides are commonly used to provide a sliding motion for a drawer. However, such drawer slides can have a flimsily feel to an appliance user. In particular, such drawer slides can permit racking and other movement of the drawer during shifting of the drawer between the open and closed position. By permitting movement of the drawer in various undesirable directions, a user can have a negative impression of the drawer and its associated appliance.

Accordingly, a drawer assembly having features for providing a user of drawer assembly with a solid and/or robust feel as the drawer assembly shifts between a closed position and an open position would be useful. In particular, a drawer assembly with features for limiting movement of the drawer except along a sliding direction between the open and closed positions would be useful.

BRIEF DESCRIPTION OF THE INVENTION

The present subject matter provides a translatable support mechanism. The translatable support mechanism includes a storage component, a pair of supports, and a pair of gear sets. The pair of supports and the pair of gear sets support the storage component such that the storage component is translatable between an open and closed position along a transverse direction. Additional aspects and advantages of the invention will be set forth in part in the following description, or may be apparent from the description, or may be learned through practice of the invention.

In a first exemplary embodiment, a translatable support mechanism is provided. The translatable support mechanism defines a vertical direction, a lateral direction, and a transverse direction. The vertical, lateral, and transverse directions are mutually perpendicular. The translatable support mechanism includes a storage component having a first side portion and a second side portion spaced apart from each other along the lateral direction and a pair of supports. Each support of the pair of supports is positioned proximate a respective one of the first and second side portions of the storage component. Each support of the pair of supports has a first geared rack and a second geared rack. The first and second geared racks are spaced apart from each other along the vertical direction. A pair of gear sets is rotatably mounted to the storage component. Each gear set of the pair of gear sets is positioned proximate a respective one of the pair of supports. Each gear set of the pair of gear sets has a first gear that meshes a respective first geared rack of the pair of supports and a second gear that meshes a respective second geared rack of the pair of supports. The first and second gears of each gear set of the pair of gear sets also mesh with each other. The pair of supports and the pair of gear sets support the storage component such that the storage component is translatable along the transverse direction between an open and closed position.

In a second exemplary embodiment, a drawer assembly is provided. The drawer assembly defines a vertical direction, a lateral direction, and a transverse direction. The vertical, lateral, and transverse directions are mutually perpendicular. The drawer assembly includes a bin that defines a storage volume for receipt of items for storage. The bin extends between a first side portion and a second side portion along the lateral direction. A first support is positioned proximate the first side portion of the bin. The first support defines a channel that extends between a top portion and a bottom portion. The first support has a first plurality of teeth positioned within the channel of the first support at the top portion of the channel of the first support. The first support also has a second plurality of teeth positioned within the channel of the first support at the bottom portion of the channel second. A second support is positioned proximate the second side portion of the bin. The second support defines a channel that extends between top portion and a bottom portion. The second support has a first plurality of teeth positioned within the channel of the second support at the top portion of the channel of the second support. The second support also has a second plurality of teeth positioned within the channel of the second support at the bottom portion of the channel of the second support. A first gear set is rotatably mounted to the bin and positioned within the channel of the first support. The first gear set has a first gear and a second gear. The first gear of the first gear set meshes with the first plurality of teeth of the first support. The second gear of the first gear set meshes with the second plurality of teeth of the first support. The first and second gears of the first gear set also mesh with each other. A second gear set is rotatably mounted to the bin and positioned within the channel of the second support. The second gear set has a first gear and a second gear. The first gear of the second gear set meshes with the first plurality of teeth of the second support. The second gear of the second gear set meshes with the second plurality of teeth of the second support. The first and second gears of the second gear set also mesh with each other.

In a third exemplary embodiment, a translatable support mechanism is provided. The translatable support mechanism includes a storage component. A support defines a channel that extends between a first portion and a second portion. The support has a first plurality of teeth positioned within the channel of the support proximate the first portion of the channel. The support also has a second plurality of teeth positioned within the channel of the support proximate the second portion of the channel. A gear set is rotatably mounted to the storage component and is positioned within the channel of the support. The gear set has a first gear and a second gear. The first gear of the gear set meshes with the first plurality of teeth of the support. The second gear of the gear set meshes with the second plurality of teeth of the support. The first and second gears of the gear set also mesh with each other.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
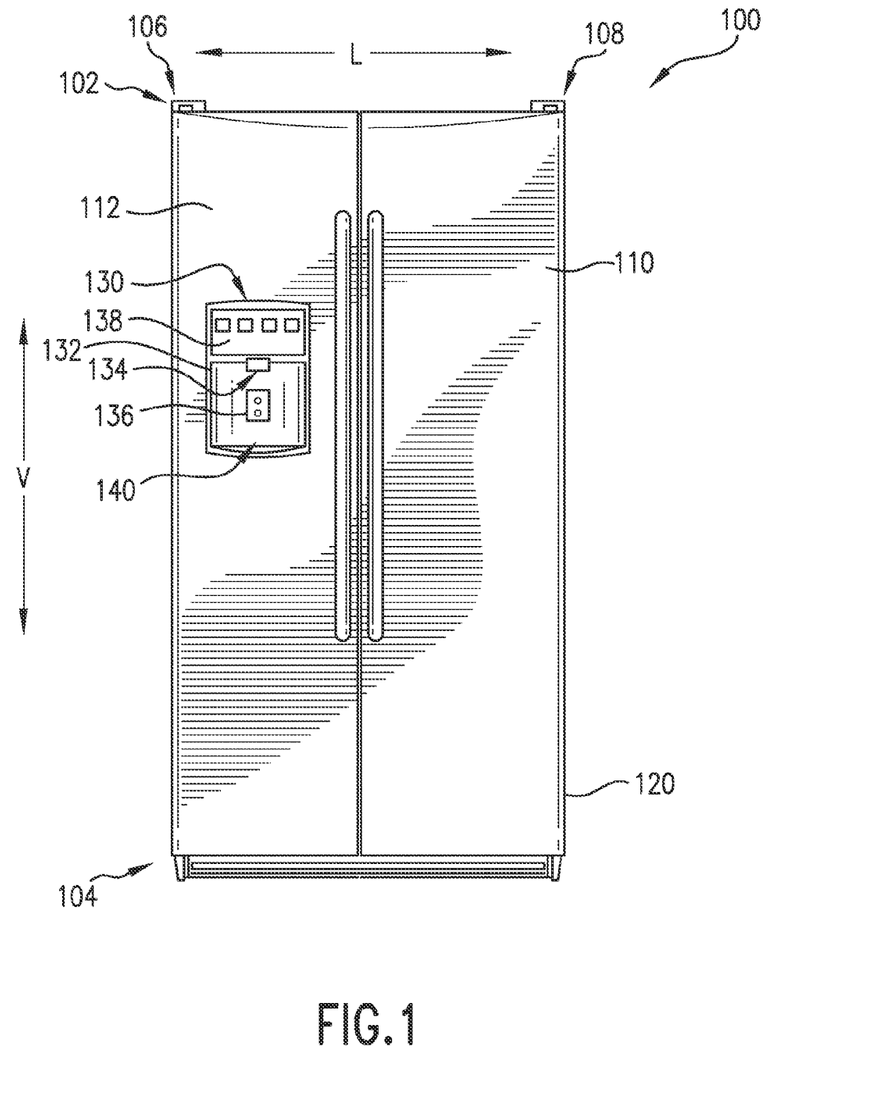
FIG. 1 provides a front, elevation view of an exemplary refrigerator as may be used with the present subject matter.
Figure 2:
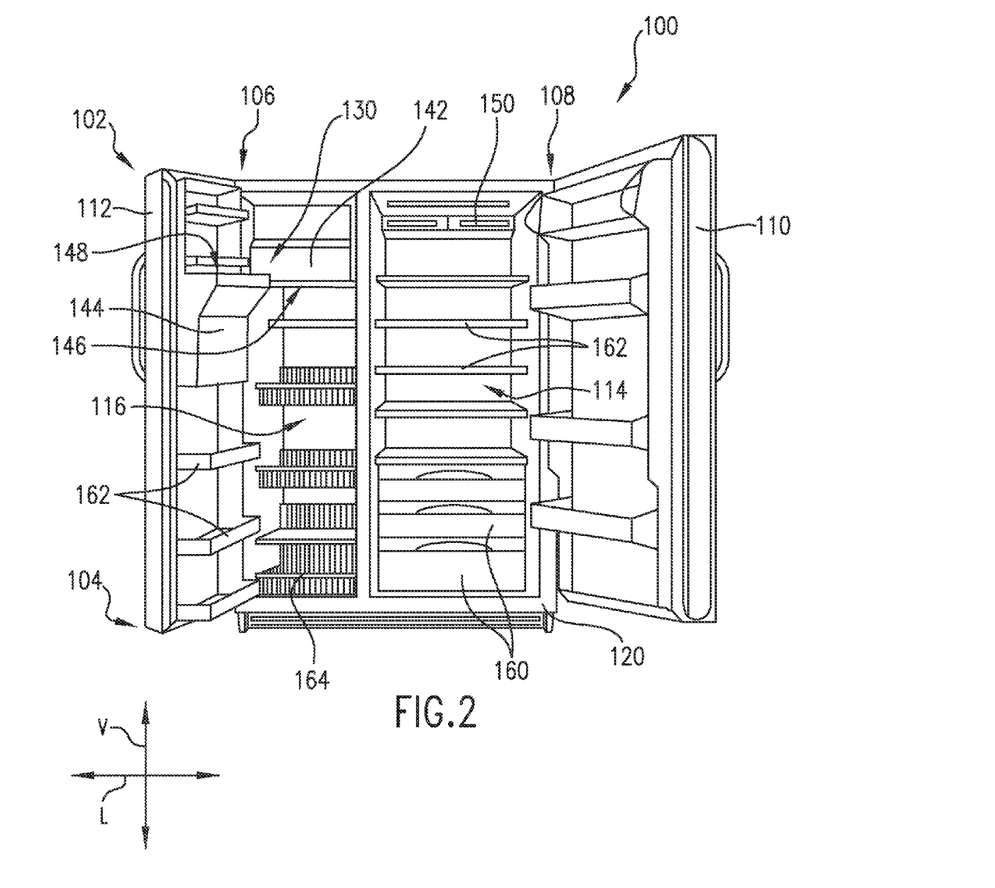
FIG. 2 provides a front, elevation view of the exemplary refrigerator appliance of FIG. 1 with a refrigerator door and a freezer door of the exemplary refrigerator appliance shown in an open position to reveal a fresh food chamber and a freezer chamber of the exemplary refrigerator appliance.

FIG. 1 provides a front, elevation view of a refrigerator appliance 100. FIG. 2 provides a front, elevation view of refrigerator appliance 100 with a refrigerator door 110 and a freezer door 112 of refrigerator appliance 100 shown in an open position to reveal a fresh food chamber 114 and a freezer chamber 116 of refrigerator appliance 100. Refrigerator appliance 100 defines a vertical direction V, a transverse direction T (FIG. 3), and a lateral direction L. The vertical direction V, transverse direction T, and lateral direction L are mutually perpendicular and form an orthogonal direction system. Refrigerator appliance 100 extends between an upper portion 102 and a lower portion 104 along the vertical direction V. Refrigerator appliance 100 also extends between a first side portion 106 and a second side portion 108, e.g., along the lateral direction L.

Refrigerator appliance 100 includes a cabinet 120 that defines chilled chambers for receipt of food items for storage. In particular, refrigerator appliance 100 defines fresh food chamber 114 at first side portion 106 of refrigerator appliance 100 and a freezer chamber 116 arranged next to fresh food chamber 114 at second side portion 108 of refrigerator appliance 100. As such, refrigerator appliance 100 is generally referred to as a side-by-side style refrigerator appliance. However, using the teachings disclosed herein, one of skill in the art will understand that the present subject matter may be used with other types of refrigerator appliances (e.g., bottom mount or top mount style) or a freezer appliance as well. Consequently, the description set forth herein is for illustrative purposes only and is not intended to limit the present subject matter in any aspect.

Refrigerator door 110 is rotatably hinged to an edge of cabinet 120 for accessing fresh food chamber 114. Similarly, freezer door 112 is rotatably hinged to an edge of cabinet 120 for accessing freezer chamber 116. Refrigerator door 110 and freezer door 112 can rotate between an open position (shown in FIG. 2) and a closed position (shown in FIG. 1) in order to permit selective access to fresh food chamber 114 and freezer chamber 116, respectively.

Refrigerator appliance 100 also includes a dispensing assembly 130 for dispensing water and/or ice. Dispensing assembly 130 includes a dispenser 132 positioned on or mounted to an exterior portion of refrigerator appliance 100, e.g., on freezer door 112. Dispenser 132 includes a discharging outlet 134 for accessing ice and water. Any suitable actuator may be used to operate dispenser 132. For example, dispenser 132 can include a paddle or button for operating dispenser. A sensor 136, such as an ultrasonic sensor, is mounted below discharging outlet 134 for operating dispenser 132, e.g., during an auto-fill process of refrigerator appliance 100. A user interface panel 138 is provided for controlling the mode of operation. For example, user interface panel 138 includes a water dispensing button (not labeled) and an ice-dispensing button (not labeled) for selecting a desired mode of operation such as crushed or non-crushed ice.

Discharging outlet 134 and sensor 136 are an external part of dispenser 130 and are mounted in a dispenser recess 140 defined in an outside surface of freezer door 112. Dispenser recess 140 is positioned at a predetermined elevation convenient for a user to access ice or water and enabling the user to access ice without the need to bend-over and without the need to access freezer chamber 116. In the exemplary embodiment, dispenser recess 140 is positioned at a level that approximates the chest level of a user.

Turning now to FIG. 2, certain components of dispensing assembly 130 are illustrated. Dispensing assembly 130 includes a housing 142 mounted within freezer chamber 116. Housing 142 is constructed and arranged to facilitate production and storage of ice. More particularly, housing 142 contains an ice maker (not shown) for creating ice and feeding the same to a container 144 that is mounted on freezer door 112. As illustrated in FIG. 2, container 144 is placed at a vertical position on freezer door 112 that will allow for the receipt of ice from a discharge opening 146 into an entrance 148 of container 144. As freezer door 112 is closed or opened, container 144 is moved in and out of position under housing 142.

Operation of the refrigerator appliance 100 can be regulated by a controller 150 that is operatively coupled to user interface panel 138 and/or sensor 136. User interface panel 138 provides selections for user manipulation of the operation of refrigerator appliance 100 such as e.g., selections between whole or crushed ice, chilled water, and/or other options as well. In response to user manipulation of the user interface panel 138, controller 150 operates various components of the refrigerator appliance 100. Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may be positioned in a variety of locations throughout refrigerator appliance 100. In the illustrated embodiment, controller 150 is located at upper portion 102 or refrigerator appliance 100 within fresh food chamber 114. However, in alternative exemplary embodiments, controller 150 may be located within the control panel area of freezer door 112. Input/output ("I/O") signals may be routed between controller 150 and various operational components of refrigerator appliance 100. For example, user interface panel 138 may be in communication with controller 150 via one or more signal lines or shared communication busses.

Refrigerator appliance 100 also includes various storage components mounted within fresh food chamber 114 and freezer chamber 116 to facilitate storage of food items therein as will be understood by those skilled in the art. In particular, the storage components include drawers 160, shelves 162, and baskets 164 that are mounted within fresh food chamber 114 and freezer chamber 116. Drawers 160, shelves 162, and baskets 164 are configured for receipt of food items (e.g., beverages and/or solid food items) and may assist with organizing such food items. As an example, drawers 160 within fresh food chamber 114 can receive fresh food items (e.g., vegetables, fruits, and/or cheeses) and increase the useful life of such fresh food items.

Figure 3:
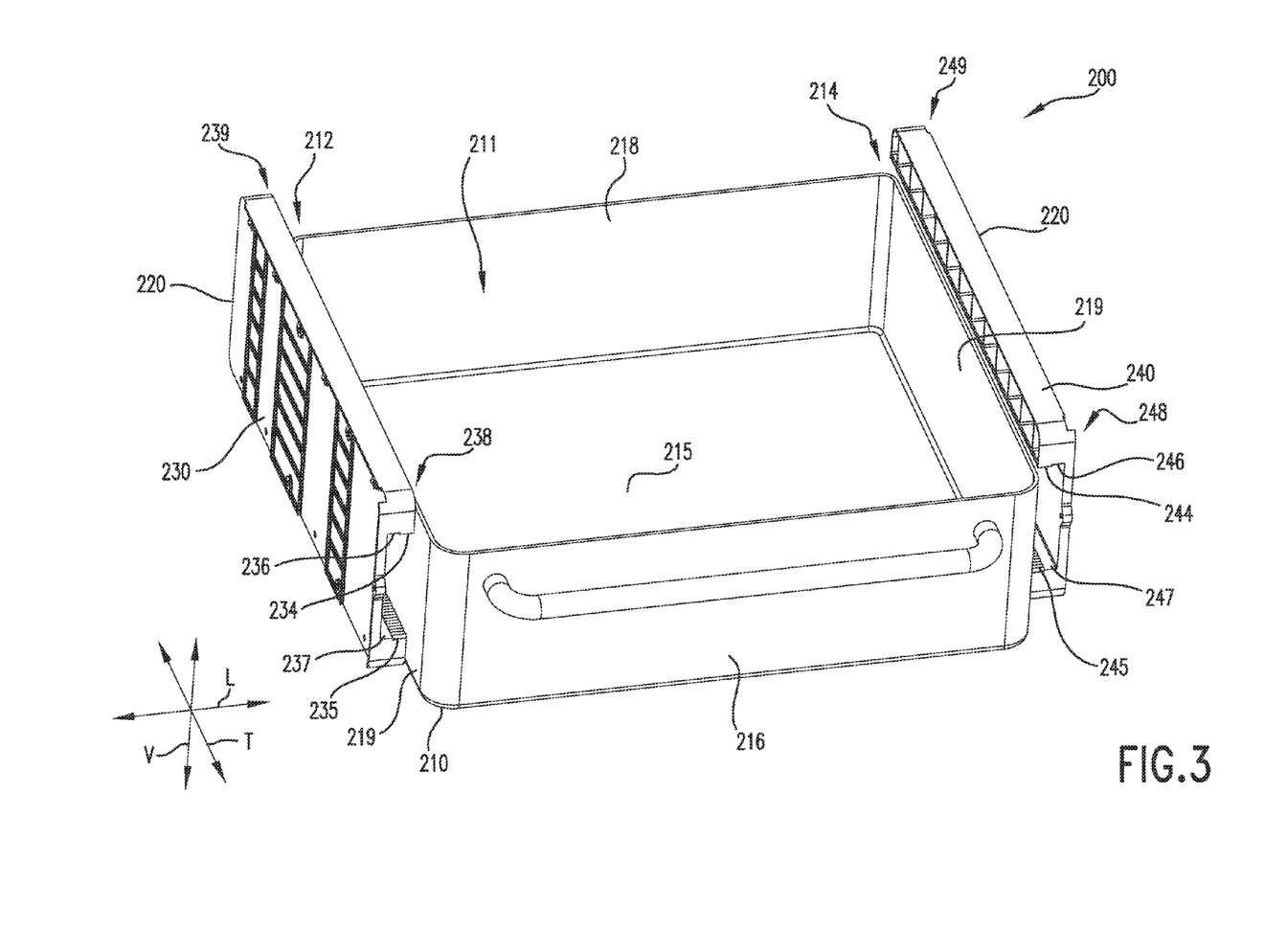
FIG. 3 provides a front, perspective view of a drawer assembly according to an exemplary embodiment of the present subject matter.
Figure 4:
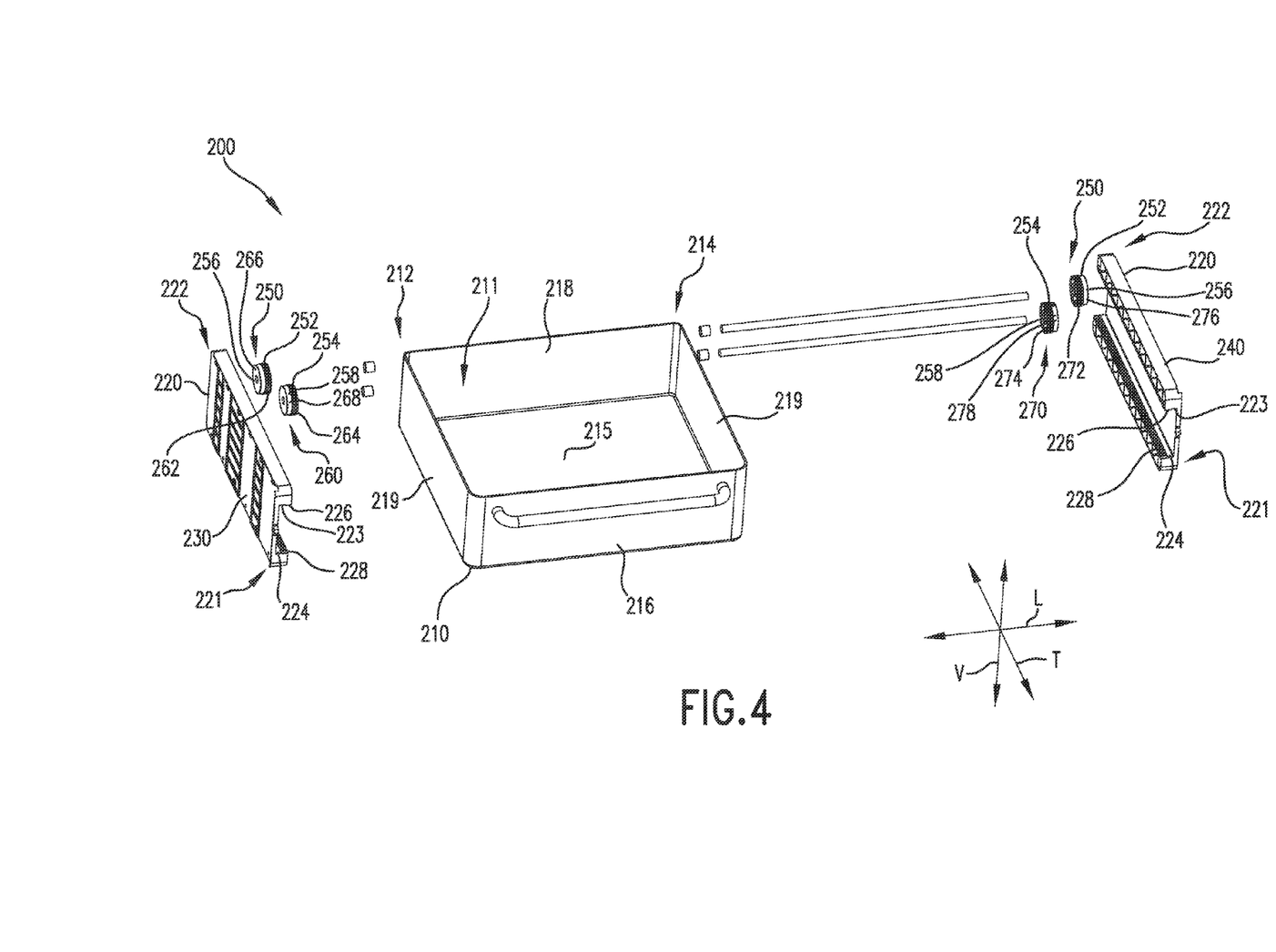
FIG. 4 provides an exploded view of the exemplary drawer assembly of FIG. 3.

FIG. 3 provides a front, perspective view of a drawer assembly 200 according to an exemplary embodiment of the present subject matter. FIG. 4 provides an exploded view of drawer assembly 200. Drawer assembly 200 can be used in any suitable appliance. As an example, drawer assembly 200 may be used in refrigerator appliance 100 (FIG. 1) as one of drawers 160 (FIG. 2). In alternative exemplary embodiments, drawer assembly 200 may be used in oven appliances, dishwasher appliances, washing machine appliances, etc.

Drawer assembly 200 includes a storage component 210. In the exemplary embodiment shown in FIGS. 3 and 4, storage component 210 is shown as a bin. Thus, in the exemplary embodiment shown in FIGS. 3 and 4, storage component 210 includes a bottom wall 215, a front wall 216, a rear wall 218, and sidewalls 219 that define a storage volume 211. Storage volume 211 of storage component 210 is configured for receipt of articles for storage. As an example, when drawer assembly 200 is positioned within fresh food chamber 114 of refrigerator appliance 100, fresh fruit and/or fresh vegetable may be placed within storage volume 211 of storage component 210. In alternative exemplary embodiments, any suitable article may be placed or received within storage volume 211 of storage component 210.

Storage component 210 extends between a first side portion 212 and a second side portion 214, e.g., along the lateral direction L. Thus, first and second side portions 212 and 214 of storage component 210 are spaced apart from each other, e.g., along the lateral direction L. Each side wall of sidewalls 219 is positioned at or proximate a respective one of first and second side portions 212 and 214 of storage component 210.

It should be understood that storage component 210 shown in FIGS. 3 and 4 is provided by way of example only and is not intended to limit the present subject matter. Thus, in alternative exemplary embodiments, storage component 210 can be any suitable storage component. For example, storage component 210 may be an oven rack when drawer assembly 200 is used within an oven appliance. As another example, storage component 210 may be a dishwasher rack when drawer assembly 200 is used within a dishwasher appliance.

Drawer assembly 200 also includes a pair of brackets or supports 220 that can be mounted to an appliance, e.g., cabinet 120 of refrigerator appliance 100. For example, fasteners may extend through supports 220 into cabinet 120, supports 220 may be integrally mounted or molded to cabinet 120. Each support of supports 220 is positioned proximate a respective one of first and second side portions 212 and 214 of storage component 210. In particular, supports 220 include a first support 230 and a second support 240. First support 230 is positioned at or proximate first side portion 212 of storage component 210. Conversely, second support 240 is positioned at or proximate second side portion 214 of storage component 210.

As shown in FIG. 4, drawer assembly 200 further includes a pair of gear sets 250. Gear sets 250 are rotatably mounted to storage component 210 and engage supports 220 in order to mount storage component 210 to supports 220 such that storage component 210 is translatable or slidable, e.g., along the transverse direction T, relative to supports 220. Each gear set of gear sets 250 is positioned at or proximate a respective one of supports 220. In particular, gear sets 250 include a first gear set 260 and a second gear set 270. First gear set 260 is positioned at or proximate first support 230. Conversely, second gear set 270 is positioned at or proximate second support 240.

Each gear set of gear sets 250 has a first gear 252 and a second gear 254. In particular, first gear set 260 includes a first gear 262 and a second gear 264. Similarly, second gear set 270 includes a first gear 272 and a second gear 274. First gears 252 of gear sets 250 are positioned above second gears 254 of gear sets 250, e.g., along the vertical direction V. In particular, first gear 262 of first gear set 260 is positioned above second gear 264 of first gear set 260, e.g., along the vertical direction V. Similarly, first gear 272 of second gear set 270 is positioned above second gear 274 of second gear set 270, e.g., along the vertical direction V. First gear set 260, e.g., first and second gears 262 and 264 of first gear set 260, engages first support 230 and second gear set 270, e.g., first and second gears 272 and 274 of second gear set 270, engages second support 240 in order to slidably mount storage component 210 to supports 220 as discussed in greater detail below.

Figure 5:
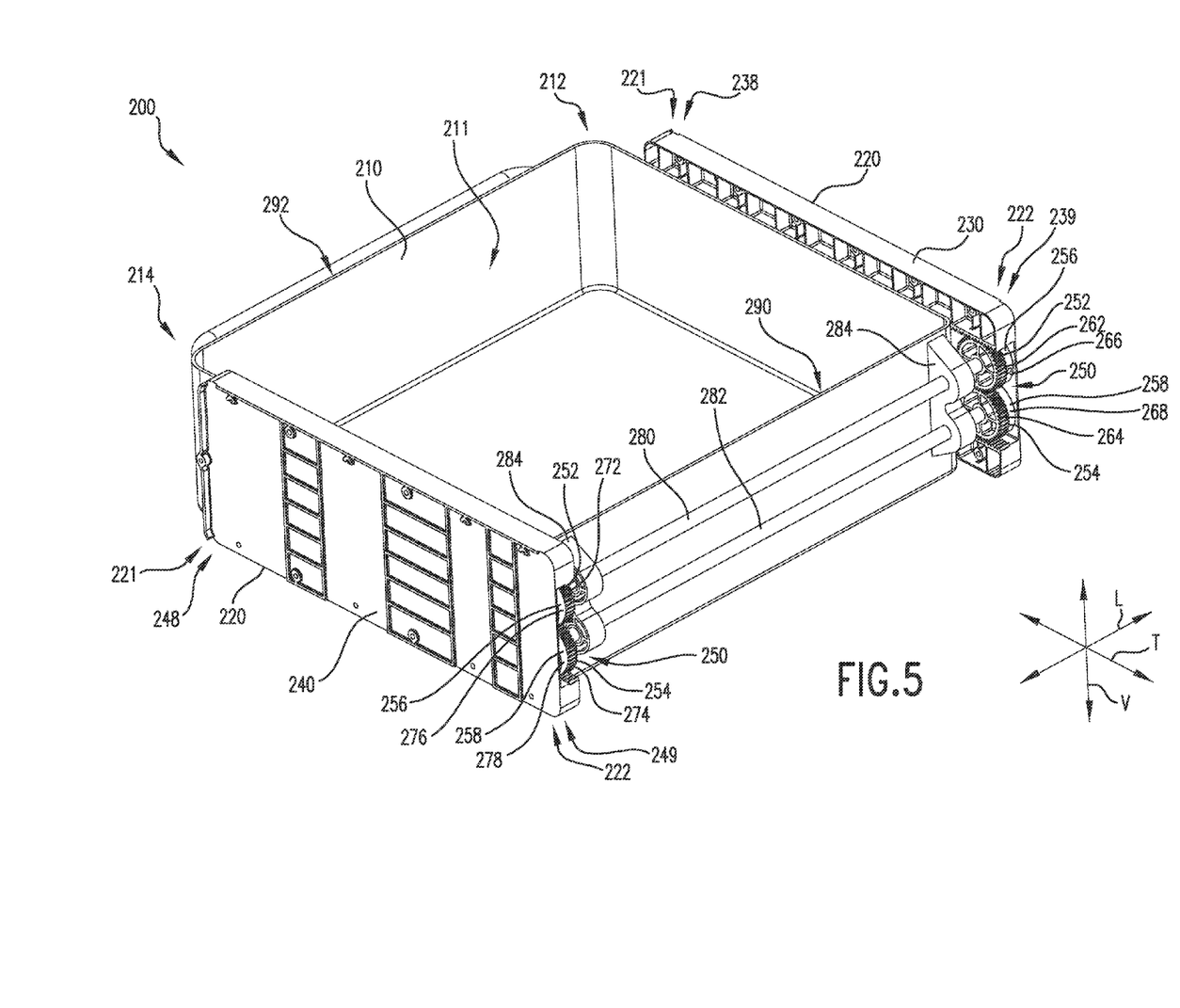
FIG. 5 provides a rear, perspective view of the exemplary drawer assembly of FIG. 3 with a storage component of the exemplary drawer assembly shown in a closed position.
Figure 6:
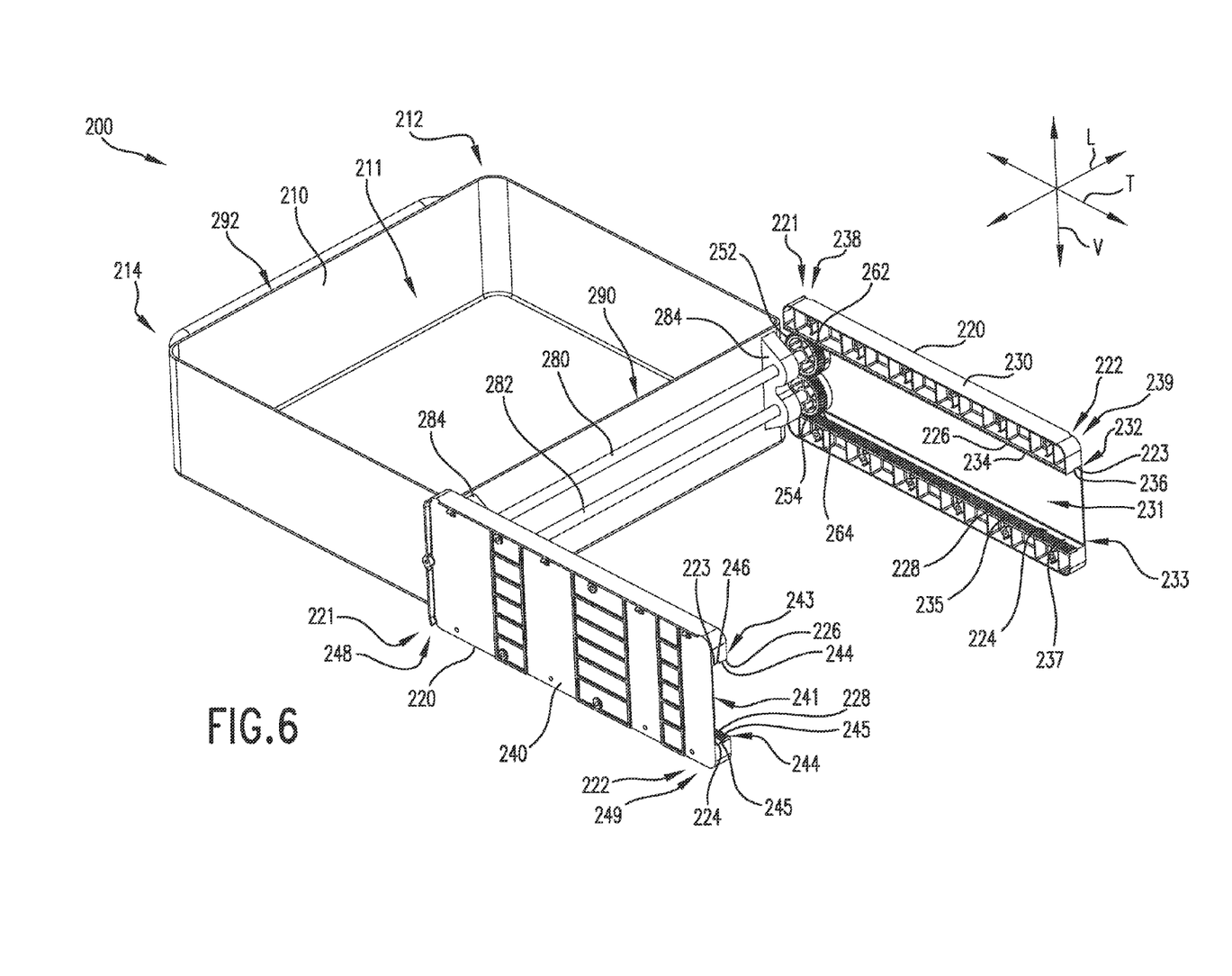
FIG. 6 provides a rear, perspective view of the exemplary drawer assembly of FIG. 3 with the storage component of the exemplary drawer assembly shown in an open position.

FIG. 5 provides a rear, perspective view of drawer assembly 200 with storage component 210 of drawer assembly 200 shown in the closed position. FIG. 6 provides a rear, perspective view of drawer assembly 200 with storage component 210 of drawer assembly 200 shown in the open position. Supports 220 and gear sets 250 support storage component 210 such that storage component 210 is slidable or movable, e.g., along the transverse direction T, between the open and closed positions.

As may be seen in FIGS. 5 and 6, drawer assembly 200 includes a first axle 280 and a second axle 282. First axle 280 extends between and couples first gears 252 of gear sets 250 together. Similarly, second axle 282 extends between and couples second gears 254 of gear sets 250 together. In alternative exemplary embodiments, first gears 252 of gear sets 250 are molded or integrally mounted to first axle 280, e.g., first axle 280 may define first gears 252 of gear sets 250. Similarly, second gears 254 of gear sets 250 are molded or integrally mounted to second axle 282, e.g., second axle 282 may define second gears 254 of gear sets 250.

As shown in FIG. 5, first axle 280 extends between and couples first gear 262 of first gear set 260 and first gear 272 of second gear set 270 together. Similarly, second axle 282 extends between and couples second gear 264 of first gear set 260 and second gear 274 of second gear set 270 together. First axle 280 couples first gears 252 of gear sets 250 together, e.g., such that first gears 252 of gear sets 250 rotate together or simultaneously during shifting of storage component 210 between the open and closed positions. Similarly, second axle 282 couples second gears 254 of gear sets 250 together, e.g., such that second gears 254 of gear sets 250 rotate together or simultaneously during shifting of storage component 210 between the open and closed positions. In such a manner, first and second axles 280 and 284 can hinder or limit racking of storage component 210, e.g., as storage component 210 shifts between the open and closed positions. In alternative exemplary embodiments, first and second axles 280 and 282 need not couple first and second gear sets 260 and 270 together such that first and second gear sets 260 and 270 rotate together or simultaneously during shifting of storage component 210 between the open and closed positions.

A pair of brackets 284 is mounted to storage component 210, e.g., at a back portion 290 of storage component 210, such as rear wall 218 of storage component 210. First and second axles 280 and 284 are rotatably mounted to brackets 284 in order to mount or couple gear sets 250 to storage component 210. It should be understood that gear sets 250 can be rotatably mounted to storage component 210 in any suitable manner in alternative exemplary embodiments. For example, gear sets 250 can be directly mounted to storage component 210, and drawer assembly 200 need not include first and second axles 280 and 284.

As may be seen in FIGS. 4 and 6, each support of supports 220 has a first geared rack 226 and a second geared rack 228. First and second geared racks 226 and 228 of supports 220 are spaced apart from each other, e.g., along the vertical direction V.

In particular, first support 230 defines a channel 231 that extends between a top portion 232 and a bottom portion 233, e.g., along the vertical direction V. First support 230 has a first geared rack or plurality of teeth 234 positioned within channel 231 of first support 230, e.g., at top portion 232 of channel 231. First support 230 also has a second geared rack or plurality of teeth 235 positioned within channel 231 of first support 230, e.g., at bottom portion 233 of channel 231. Thus, first and second pluralities of teeth 234 and 235 of first support 230 are spaced apart from each other, e.g., along the vertical direction V. Similarly, second support 240 defines a channel 241 that extends between a top portion 242 and a bottom portion 243, e.g., along the vertical direction V. Second support 240 has a first geared rack or plurality of teeth 244 positioned within channel 241 of second support 240, e.g., at top portion 242 of channel 241. Second support 240 also has a second geared rack or plurality of teeth 245 positioned within channel 241 of second support 240, e.g., at bottom portion 243 of channel 241. Thus, first and second pluralities of teeth 244 and 245 of second support 240 are spaced apart from each other, e.g., along the vertical direction V.

First gears 252 of gears sets 250 mesh with a respective first geared rack 226 of supports 220, and second gears 254 of gear sets 250 mesh with a respective second geared rack 228 of supports 220. First and second gears 252 and 254 of each gear set 250 also mesh with each other.

In particular, first gear set 260 is positioned or received within channel 231 of first support 230. First gear 262 of first gear set 260 meshes with first plurality of teeth 234 of first support 230, and second gear 264 of first gear set 260 meshes with second plurality of teeth 235 of first support 230. First and second gears 262 and 264 of first gear set 260 also mesh with each other. Similarly, second gear set 270 is positioned or received within channel 241 of second support 240. First gear 272 of second gear set 270 meshes with first plurality of teeth 244 of second support 240, and second gear 274 of second gear set 270 meshes with second plurality of teeth 245 of second support 240. First and second gears 272 and 274 of second gear set 270 also mesh with each other.

Each support 220 extends between a front portion 221 and a rear portion 222, e.g., along the transverse direction, T. Thus, front and rear portions 221 and 222 or supports 220 are spaced part from each other, e.g., along the transverse direction, T. First and second geared racks 226 and 228 of supports 220 extend, e.g., along the transverse direction T, between about front and rear portions 221 and 222 of supports 220. Thus, teeth of first and second geared racks 226 and 228 of supports 220 are spaced apart from one another, e.g., other along the transverse direction T.

In particular, first support 230 extends between a front portion 238 and a rear portion 239, e.g., along the transverse direction T. First and second pluralities of teeth 234 and 235 of first support 230 extend, e.g., along the transverse direction T, between about front and rear portions 238 and 239 of first support 230. Thus, teeth of first and second pluralities of teeth 234 and 235 of first support 230 are spaced apart from one another, e.g., along the transverse direction T. Similarly, second support 240 extends between a front portion 248 and a rear portion 249, e.g., along the transverse direction T. First and second pluralities of teeth 244 and 245 of second support 240 extend, e.g., along the transverse direction T, between about front and rear portions 240 and 249 of second support 240. Thus, teeth of first and second pluralities of teeth 244 and 245 of second support 240 are spaced apart from one another, e.g., along the transverse direction T.

First and second gears 252 and 254 of gear sets 250 can engage first and second geared racks 226 and 228 of supports 220, respectively, in order to support storage component 210. In particular, first and second gears 252 and 254 of gear sets 250 can engage first and second geared racks 226 and 228 of supports 220, respectively, such that storage component 210 is hindered or limited from moving or rotating downwardly along the vertical direction V while also permitting storage component 210 to move along the transverse direction T between the open and closed positions. Such interaction between supports 220 and gear sets 250 is described in greater detail below.

As may be seen in FIGS. 4 and 6, each support of supports 220 also has a first support surface 223 and a second support surface 224. First and second support surfaces 223 and 224 of supports 220 are spaced apart from each other, e.g., along the vertical direction V. First and second support surfaces 223 and 224 of supports 220 extend, e.g., along the transverse direction T, between about front and rear portions 221 and 222 of supports 220.

In particular, as may be seen in FIGS. 3 and 6, first support 230 has a first support surface 236 positioned within channel 231 of first support 230, e.g., at top portion 232 of channel 231, and a second support surface 237 positioned within channel 231 of first support 230, e.g., at bottom portion 233 of channel 231. First and second support surfaces 236 and 237 of first support 230 extend, e.g., along the transverse direction T, between about front and rear portions 238 and 239 of first support 230. Second support 240 has a first support surface 246 positioned within channel 241 of second support 240, e.g., at top portion 242 of channel 241, and a second support surface 247 positioned within channel 241 of second support 240, e.g., at bottom portion 243 of channel 241. First and second support surfaces 246 and 247 of second support 240 extend, e.g., along the transverse direction T, between about front and rear portions 248 and 249 of second support 240.

As may be seen in FIGS. 3 and 5, each gear set of gear sets 250 has a first wheel 256 that contacts and rides on a respective first support surface 223 of supports 220 and a second wheel 258 that contacts and rides on a respective second support surface 224 of supports 220. First and second wheels 256 and 258 of each gear set 250 also contact each other. In alternative exemplary embodiments, first and second wheels 256 and 258 of each gear set 250 do not contact each other.

In particular, first gear set 260 has a first wheel 266 that engages first support surface 236 of first support 230 and also has a second wheel 268 that engages second support surface 237 of first support 230. First and second wheels 266 and 268 of first gear set 260 also contact each other. Similarly, second gear set 270 has a first wheel 276 that engages first support surface 246 of second support 240 and also has a second wheel 278 that engages second support surface 247 of second support 240. First and second wheels 276 and 278 of second gear set 270 also contact each other.

First and second wheels 256 and 258 of gear sets 250 are coupled to first and second gears 252 and 254 of gears sets 250, respectively. In particular, first wheels 256 of gear sets 250 are coupled to first gears 252 of gears sets 250 such that first wheels 256 of gear sets 250 are positioned concentrically to first gears 252 of gears sets 250. Similarly, second wheels 258 of gear sets 250 are coupled to second gears 254 of gears sets 250 such that second wheels 258 of gear sets 250 are positioned concentrically to second gears 254 of gears sets 250. First and second wheels 256 and 258 of gear sets 250 are also coupled to first and second axles 280 and 282, respectively. Thus, first and second wheels 256 and 258 of gear sets 250 can rotate simultaneously with first and second gears 252 and 254 of gears sets 250, respectively.

First and second wheels 256 and 258 can contact and ride on first and second support surface 223 and 224 of supports 220, respectively, in order to provide a smooth feel as storage component 210 shifts between the open and closed positions. For example, first and second support surfaces 223 and 224 of supports 220 can be substantially flat or planar such that first and second wheels 256 and 258 roll smoothly on first and second support surfaces 223 and 224. Conversely, without first and second wheels 256 and 258, first and second gears 252 and 254 of gears sets 250 can chatter during motion of storage component 210 between the open and closed positions and provide a rougher feel to a user of drawer assembly 200 in certain exemplary embodiments. Thus, first and second wheels 256 and 258 of gear sets 250 can hinder or limit chatter within gear sets 250. In alternative exemplary embodiments, only second wheels 258 of gear sets 250 contact second support surface 224 of supports 220. Thus, first wheels 256 of gear sets 250 need not contact first support surface 223 of supports 220.

Figure 7:
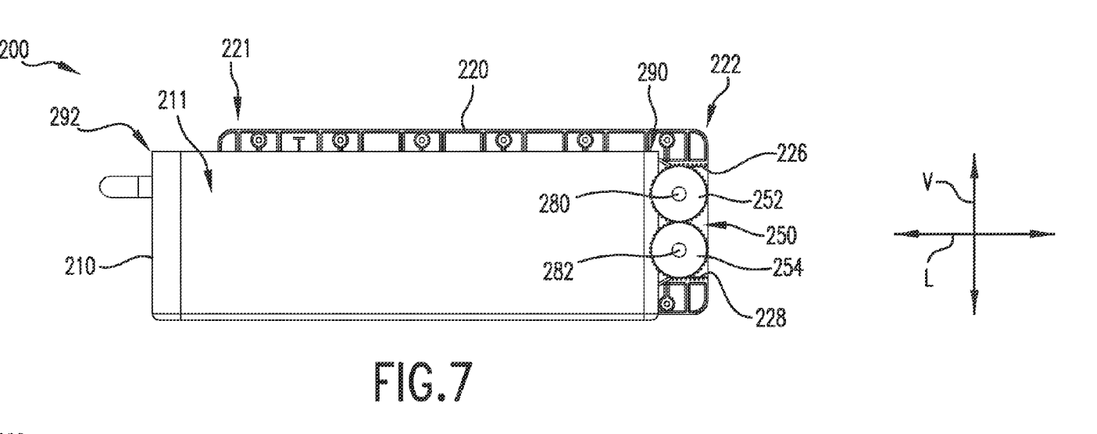
FIG. 7 provides a side, section view of the exemplary drawer assembly of FIG. 3 with the storage component of the exemplary drawer assembly shown in the closed position.
Figure 8:
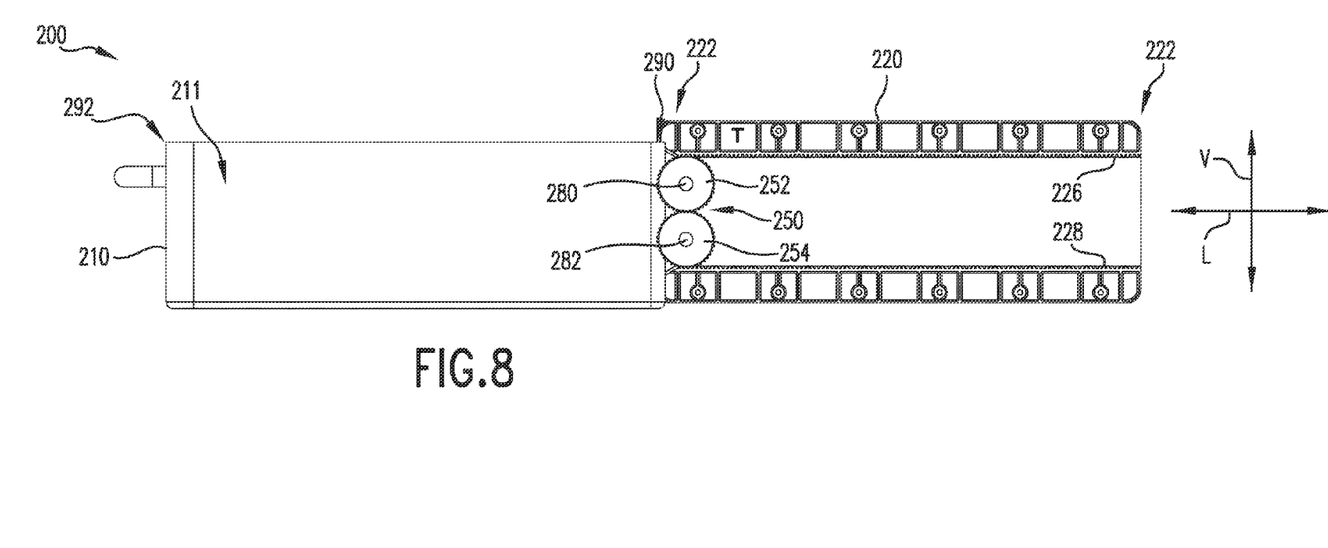
FIG. 8 provides a side, section view of the exemplary drawer assembly of FIG. 3 with the storage component of the exemplary drawer assembly shown in the open position.

FIG. 7 provides a side, section view of drawer assembly 200 with storage component 210 of drawer assembly 200 shown in the closed position. FIG. 8 provides a side, section view of drawer assembly 200 with storage component 210 of drawer assembly 200 shown in the open position. Operation of drawer assembly 200 and movement of storage component 210 between the open and closed positions will be discussed in further detail below.

As discussed above, supports 220 and gear sets 250 support storage component 210 such that storage component 210 is slidable or movable, e.g., along the transverse direction T, between the open and closed positions. As may be seen in FIGS. 7 and 8, first and second axles 280 and 282 are positioned at back portion 290 of storage component 210 such that storage component 210 is coupled to supports 220 at back portion 290 of storage component 210. Thus, a front portion 292 of storage component 210 is spaced apart from first and second axles 280 and 282, e.g., such that storage component 210 is cantilevered. Front portion 292 of storage component 210 is hindered from dropping or rotating downwardly along the vertical direction V due to interaction of supports 220 and gear sets 250. In particular, first and second gears 252 and 254 of gears sets 250 engage each other and supports 220 such that first and second gears 252 and 254 of gears sets 250 are prevented or hindered from rotating in the same direction. However, first and second gears 252 and 254 of gears sets 250 can rotate in the opposite directions. In such a manner, storage component 210 is supported along the vertical direction V while also permitting movement of storage component 210 along the transverse direction T between the open and closed positions. In addition, as discussed above, first and second wheels 256 and 258 of gears sets 250 contact each other and supports 220 such that first and second gears 252 and 254 of gears sets 250 maintain proper tooth spacing and also provide a smooth rolling motion as storage component 210 shifts between the open and closed positions.

Figure 9:
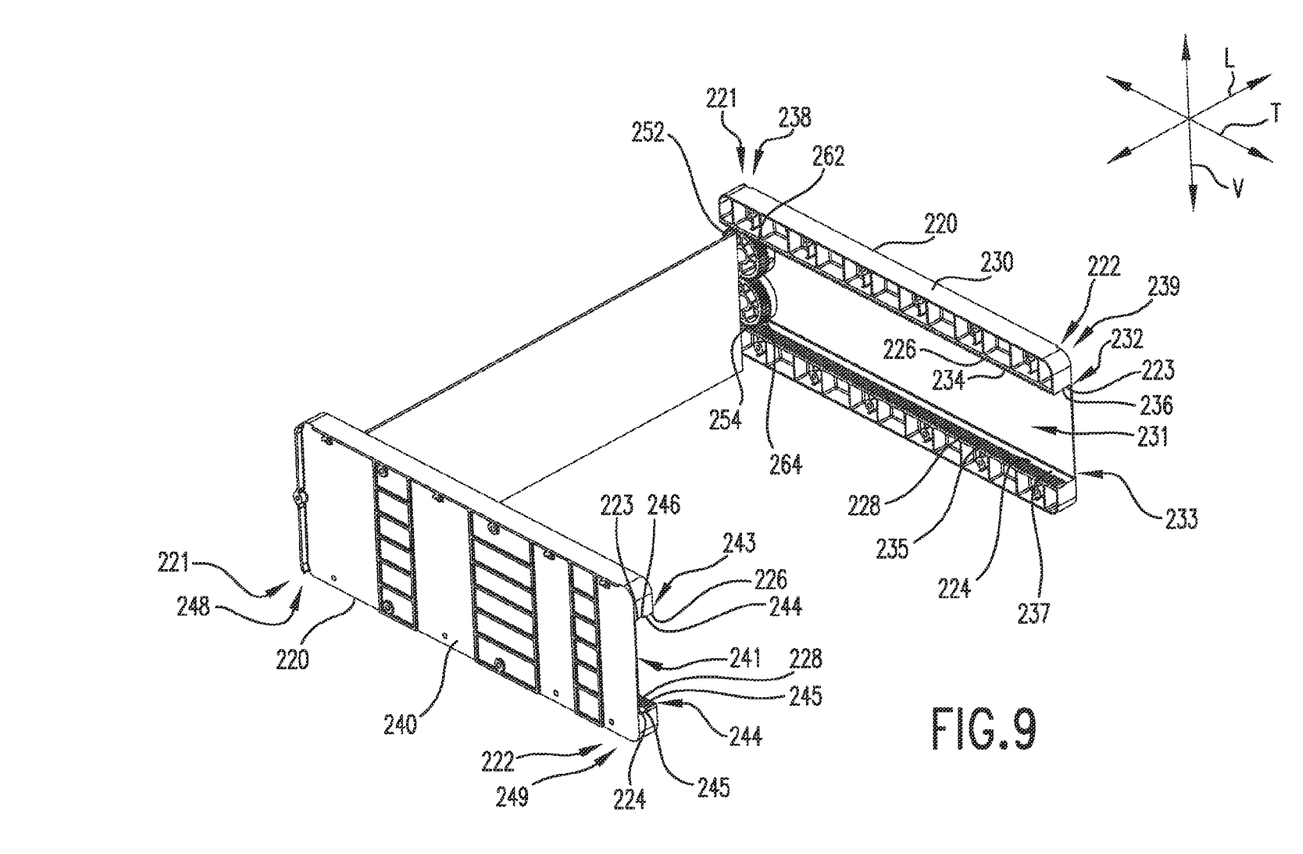
FIG. 9 provides a front, perspective view of a translatable support mechanism of the exemplary drawer assembly of FIG. 3.

FIG. 9 provides a front, perspective view of a slide mechanism or translatable support mechanism 202 of drawer assembly 200. Translatable support mechanism 202 includes supports 220 and gear sets 250. Translatable support mechanism 202 supports storage component 210 (FIG. 3) such that storage component 210 is slidable or movable, e.g., along the transverse direction T, between the open and closed positions. As will be understood by those skilled in the art, translatable support mechanism 202 can be mounted in various appliances. For example, translatable support mechanism 202 may be positioned within an oven appliance, a dishwasher appliance, a dryer appliance, etc. Translatable support mechanism 202 can be used to support various storage components. For example, an oven rack, a dishwasher rack, or a dryer storage drawer may be mounted to translatable support mechanism 202 in order to support such storage components and permit movement of such storage components along the transverse direction T.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A translatable support mechanism, the translatable support mechanism defining a vertical direction, a lateral direction, and a transverse direction, the vertical, lateral, and transverse directions being mutually perpendicular, the translatable support mechanism comprising:
    a storage component having a first side portion and a second side portion spaced apart from each other along the lateral direction;
    a pair of supports, each support of the pair of supports positioned proximate a respective one of the first and second side portions of the storage component, each support of the pair of supports having a first geared rack and a second geared rack, the first and second geared racks spaced apart from each other along the vertical direction;
    a pair of gear sets rotatably mounted to the storage component, each gear set of the pair of gear sets positioned proximate a respective one of the pair of supports, each gear set of the pair of gear sets having a first gear that meshes with a respective first geared rack of the pair of supports and a second gear that meshes a respective second geared rack of the pair of supports, the first and second gears of each gear set of the pair of gear sets also meshing with each other;
    a first axle extending between and coupling the first gears of the pair of gear sets together; and
    a second axle extenting between and coupling second gears of the pair of gears sets together;
    wherein the pair of supports and the pair of gear sets support the storage component such that the storage component is translatable along the transverse direction between an open and closed position.

2. The translatable support mechanism of claim 1, wherein the storage component is a bin which includes a bottom wall, a front wall, a rear wall and a pair of sidewalls, the bin defining a storage compartment.

3. The translatable support mechanism of claim 1, further comprising a pair of brackets mounted to the storage component at a back portion of the storage component, the first and second axles rotatably mounted to the pair of brackets in order to rotatably mount the pair of gear sets to the storage component.

4. The translatable support mechanism of claim 1, wherein the first gears of the pair of gear sets are positioned above the second gears of the pair of gear sets along the vertical direction.

5. The translatable support mechanism of claim 1, wherein:
    each support of the pair of supports has a first support surface and a second support surface, the first and second support surfaces spaced apart from each other along the vertical direction; and
    each gear set of the pair of gear sets also having a first wheel that rides on a respective first support surface of the pair of supports and a second wheel that rides on a respective second support surface of the pair of supports, the first and second wheels of each gear set of the pair of gear sets also contacting each other.

6. The translatable support mechanism of claim 5, wherein each support of the pair of supports extending between a front portion and a rear portion along the transverse direction, the first and second geared rack of each support of the pair of supports and the first and second support surfaces of each support of the pair of supports extending along the transverse direction between about the front and rear portions of each support of the pair of supports.

7. The translatable support mechanism of claim 1, wherein teeth of the first and second geared racks of the pair of supports are spaced apart from one another other along the transverse direction.

8. The translatable support mechanism of claim 1, wherein the first gears of the pair of gear sets are fixed to the first axle and the second gears of the pair of gears sets are fixed to the second axle.

9. A drawer assembly, the drawer assembly defining a vertical direction, a lateral direction, and a transverse direction, the vertical, lateral, and transverse directions being mutually perpendicular, the drawer assembly comprising:
    a bin defining a storage volume for receipt of items for storage, the bin extending between a first side portion and a second side portion along the lateral direction;
    a first support positioned proximate the first side portion of the bin, the first support defining a channel that extends between a top portion and a bottom portion, the first support having a first plurality of teeth positioned within the channel of the first support at the top portion of the channel of the first support, the first support also having a second plurality of teeth positioned within the channel of the first support at the bottom portion of the channel of the first support;
    a second support positioned proximate the second side portion of the bin, the second support defining a channel that extends between a top portion and a bottom portion, the second support having a first plurality of teeth positioned within the channel of the second support at the top portion of the channel of the second support, the second support also having a second plurality of teeth positioned within the channel of the second support at the bottom portion of the channel of the second support;
    a first gear set rotatably mounted to the bin and positioned within the channel of the first support, the first gear set having a first gear and a second gear, the first gear of the first gear set meshing with the first plurality of teeth of the first support, the second gear of the first gear set meshing with the second plurality of teeth of the first support, the first and second gears of the first gear set also meshing with each other;
    a second gear set rotatably mounted to the bin and positioned within the channel of the second support, the second gear set having a first gear and a second gear, the first gear of the second gear set meshing with the first plurality of teeth of the second support, the second gear of the second gear set meshing with the second plurality of teeth of the second support, the first and second gears of the second gear set also meshing with each other;
    a first axle extending between and coupling the first gear of the first gear set and the first gear of the second gear set together; and
    a second axle extending between and coupling the second gear of the first gear set and the second gear of the second gear set together.

10. The drawer assembly of claim 9, wherein the bin includes a bottom wall, a front wall, a rear wall and a pair of sidewalls, the bin that defining a storage compartment.

11. The drawer assembly of claim 9, further comprising a pair of brackets mounted to the bin at a back portion of the bin, the first and second axles rotatably mounted to the pair of brackets in order to rotatably mount the first and second gear sets to the bin.

12. The drawer assembly of claim 9, wherein the first gear of the first gear set is positioned above the second gear of the first gear set along the vertical direction and the first gear of the second gear set is positioned above the second gear of the second gear set along the vertical direction.

13. The drawer assembly of claim 9, wherein
the first support has a first support surface positioned within the channel of the first support at the top portion of the channel and a second support surface positioned within the channel of the first support at the bottom portion of the channel;
the second support has a first support surface positioned within the channel of the second support at the top portion of the channel and a second support surface positioned within the channel of the second support at the bottom portion of the channel;
the first gear set has a first wheel that engages the first support surface of the first support and a second wheel that engages the second support surface of the first support, the first and second wheels of the first gear set also contacting each other; and
the second gear set has a first wheel that engages the first support surface of the second support and a second wheel that engages the second support surface of the second support, the first and second wheels of the second gear set also contacting each other.

14. The drawer assembly of claim 13, wherein:
the first support extends between a front portion and a rear portion along the transverse direction, the first and second pluralities of teeth of the first support and the first and second support surfaces of the first support extending along the transverse direction between about the front and rear portions of the first support; and
the second support extends between a front portion and a rear portion along the transverse direction, the first and second pluralities of teeth of the second support and the first and second support surfaces of the second support extending along the transverse direction between about the front and rear portions of the second support.

15. The drawer assembly of claim 9, wherein the teeth of the first and second pluralities of teeth of the first support are each spaced apart from one another along the transverse direction, and the teeth of the first and second pluralities of teeth of the second support are each spaced apart from one another along the transverse direction.

16. The drawer assembly of claim 9, wherein the first gear of the first gear set and the first gear of the second gear set are fixed to the first axle and the second gear of the first gear set and the second gear of the second gear set are fixed to the second axle.

* * * * *